Figure 1:
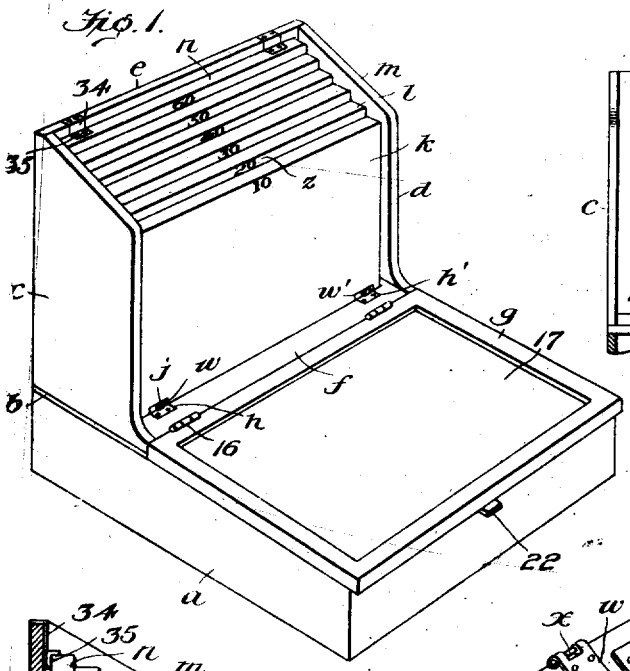

P. A. McCASKEY.

CREDIT ACCOUNTING APPLIANCE.

APPLICATION FILED FEB. 9, 1909.

Reissued Mar. 26, 1912.

13,390.

3 SHEETS—SHEET 1.

Inventor

Perry A. McCaskey.

By Edward R. Alexander

Attorney

Witnesses

C. C. Mugler

L. P. Bray

P. A. McCASKEY.

CREDIT ACCOUNTING APPLIANCE.

APPLICATION FILED FEB. 9, 1909.

Reissued Mar. 26, 1912. 13,390.

3 SHEETS—SHEET 2.

Inventor

Perry A. McCaskey

Witnesses

C. C. Wright

L. C. Brady

By Edward R. Alexander

Attorney

P. A. McCASKEY.

CREDIT ACCOUNTING APPLIANCE.

APPLICATION FILED FEB. 9, 1909.

Reissued Mar. 26, 1912.

13,390.

3 SHEETS—SHEET 3.

Witnesses

C. C. Wright

L. C. Brady

Inventor

Perry A. McCaskey

By Edward R. Alexander

Attorney

UNITED STATES PATENT OFFICE.

PERRY A. McCASKEY, OF ALLIANCE, OHIO, ASSIGNOR TO THE McCASKEY REGISTER COMPANY, OF ALLIANCE, OHIO, A CORPORATION OF OHIO.

CREDIT-ACCOUNTING APPLIANCE.

13,390. Specification of Reissued Letters Patent. Reissued Mar. 26, 1912.

Original No. 859,508, dated July 9, 1907, Serial No. 317,716. Application for reissue filed February 9, 1909. Serial No. 477,039.

*To all whom it may concern:*

Be it known that I, PERRY A. McCASKEY, a citizen of the United States, residing at Alliance, in the county of Stark and State of Ohio, have invented certain new and useful Improvements in Credit-Accounting Appliances; and I do hereby declare the following to be a full, clear, and exact description of the invention, reference being had to the accompanying drawings and to the numerals and figures of reference marked thereon.

This invention relates to cabinets or account-registers that form mechanical parts of systems for keeping credit-accounts without the use of the ordinary sets of account books, the invention having reference particularly to the hinged indexed frames or leaves of the cabinets and supports thereof, and also to the devices whereby the bill slips used in the system are conveniently held in indexed arrangement on the leaves.

Objects of the invention are to provide improved bill-holding frames or leaves in apparatus of the above-mentioned character that may be cheaply constructed and adapted to stand upright without the use of balance springs and in such manner that the index numbers or letters on their fronts may be constantly in sight, and to provide connected leaves of this character that will occupy the least possible space when removed from the cabinet to be placed in fire-proof safes.

With the above-mentioned and minor objects in view the invention consists in a plurality of bill-holding frames or leaves hinged together and normally supported when in upright positions or on end by the foremost one of the leaves, all of the leaves being so constructed and mounted as to be held upright against the back of the cabinet case by the force of gravity, the hinge pivots of each leaf being arranged at one side of the center of gravity of the leaf; the invention consists also in the pivotal devices for connecting the supporting leaf to the cabinet case, and also to the construction of the leaves and the devices connected therewith for holding the bill-slips against displacement or accidental removal from the leaves. And the invention consists further in the novel parts and the combinations and arrangements of parts, as hereinafter particularly described and claimed.

Figure 2:
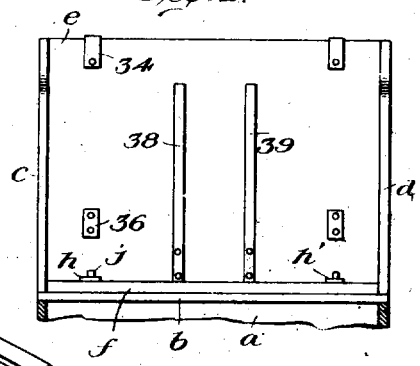
Figure 3:
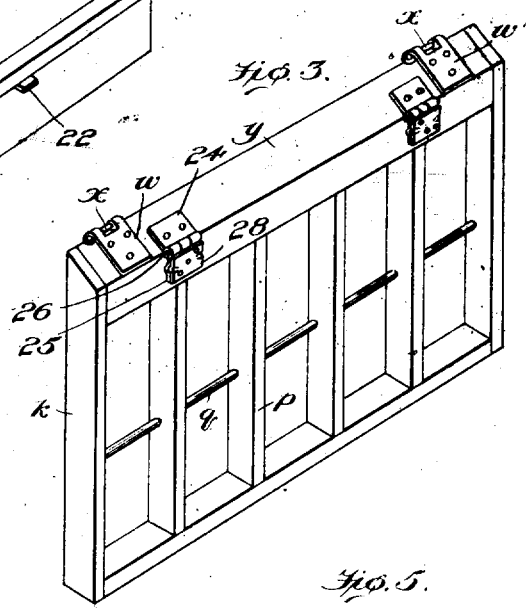
Figure 4:
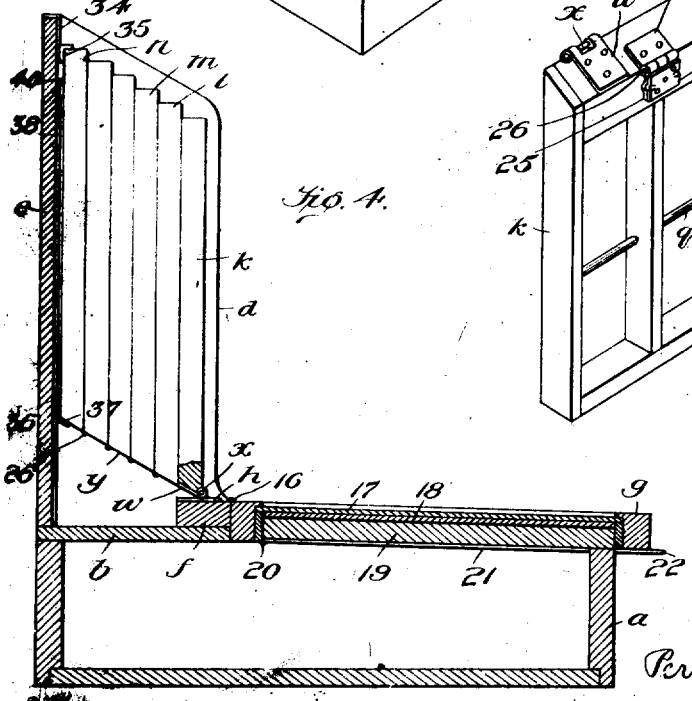
Figure 5:
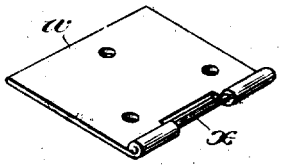
Figure 6:
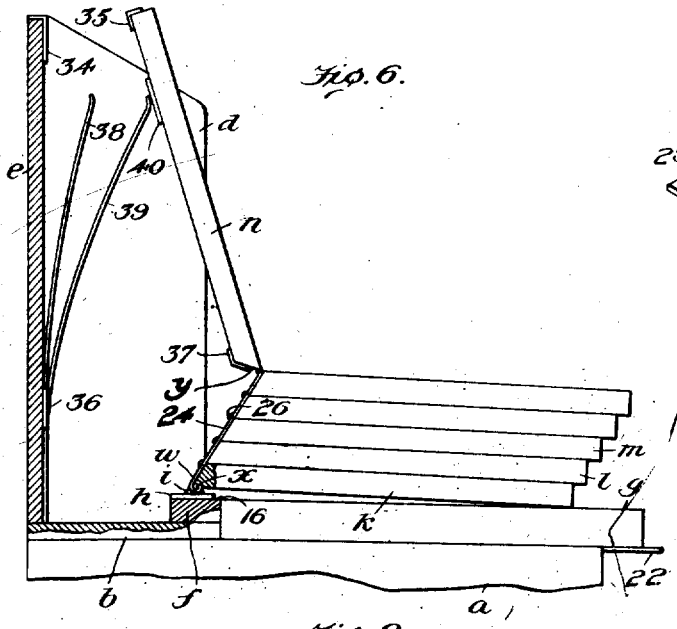
Figure 7:
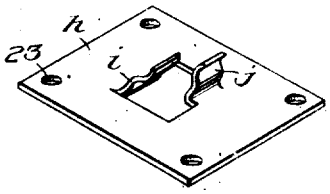
Figure 8:
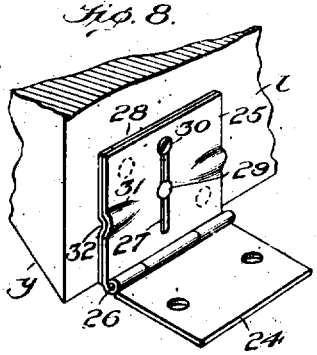
Figure 9:
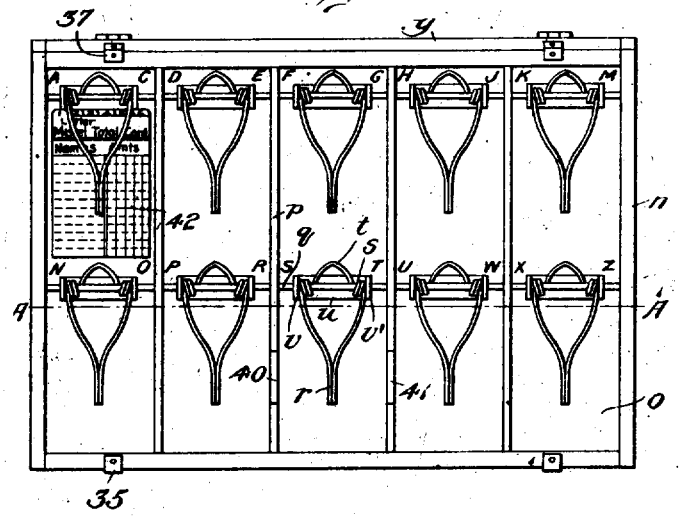
Figure 10:
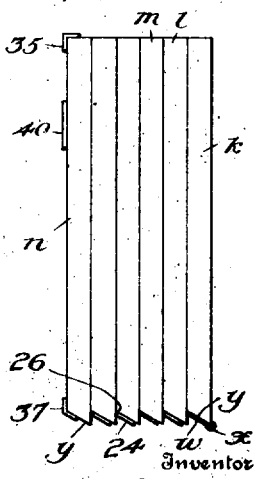
Figure 11:
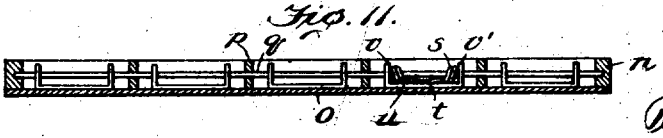
Figure 12:
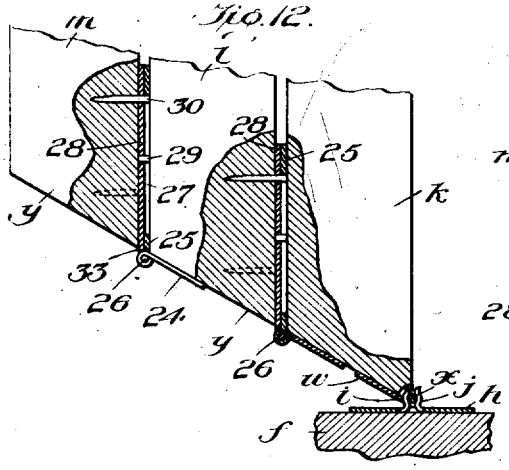
Figure 13:
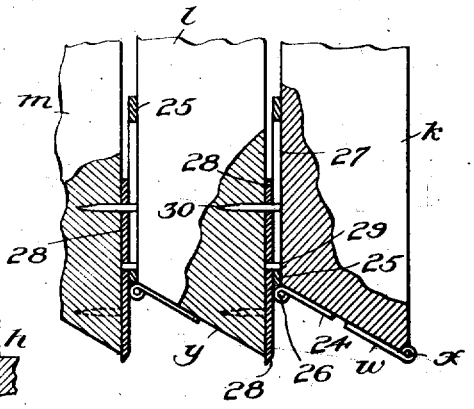
Figure 14:
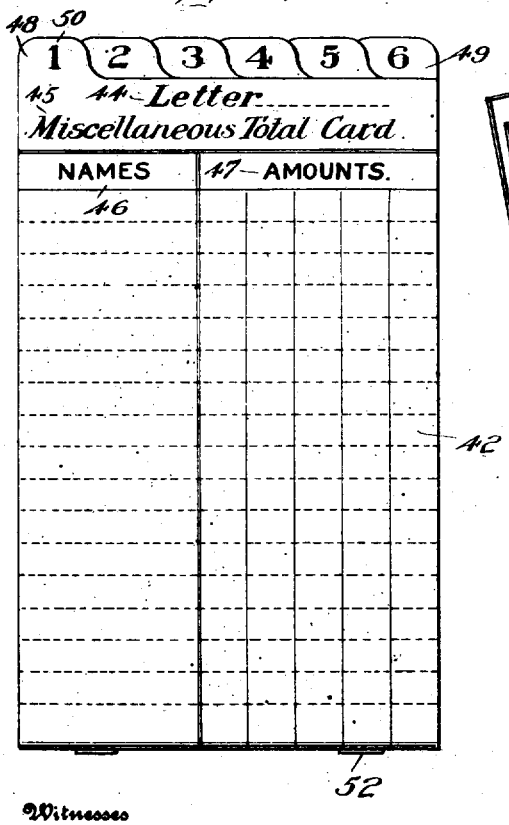
Figure 15:
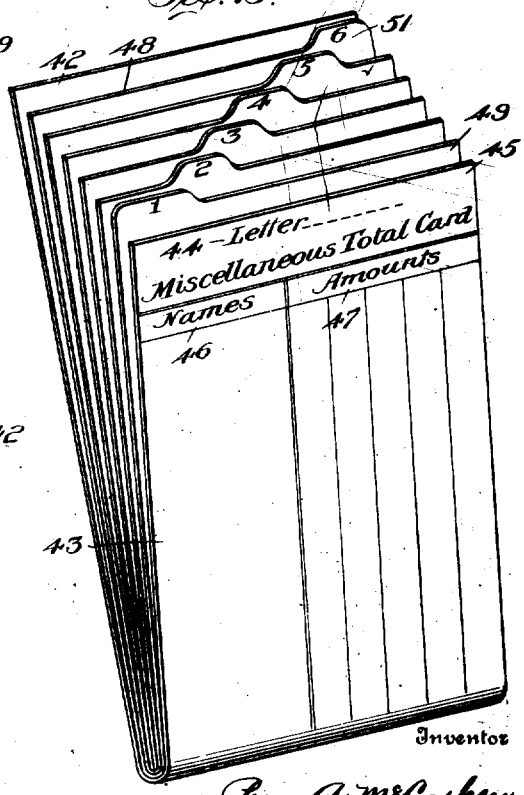

Referring to the drawings, Figure 1 is a perspective view of the filing or bill-holding cabinet with the bill-holding leaves thereof in normal positions; Fig. 2 a fragmentary front elevation of the cabinet without the leaves, showing the front of the case for the leaves; Fig. 3 a perspective view of the front or normally foremost leaf inverted and showing the novel hinging devices in connection therewith, the bill-clamps being omitted; Fig. 4 a vertical sectional view of the complete cabinet at a plane at the left-hand side of the bill-holding leaves, the latter being in normal positions; Fig. 5 a perspective view of the part of front leaf hinge that is attached thereto for supporting the set of leaves; Fig. 6 a fragmentary side elevation of the cabinet with the case broken away showing in section near the left-hand side thereof, one of the leaves being upright and the others drawn forward on the desk part of the cabinet, as when inserting or removing the bill-slips; Fig. 7 a perspective view of one of the parts whereby the front leaf is connected to the cabinet; Fig. 8 a fragmentary perspective view of a leaf and adjustable hinge connected thereto; Fig. 9 a plan view of a bill-holding leaf complete and a sub-holder connected therewith for indexing bill-slips of miscellaneous customers who may have only small accounts; Fig. 10 a side elevation of the set of leaves removed from the cabinet and adjusted to small compass for convenient insertion into fire-proof safes; Fig. 11 a sectional view showing the principal parts of a leaf, as on the line A—A in Fig. 9; Fig. 12 a fragmentary side elevation partly broken away, of a number of the bill-holding leaves in their normal positions relative one to the others; Fig. 13 a fragmentary side elevation, partly broken away, of a number of the leaves with their hinges adjusted so that the leaves may occupy the smallest space possible; Fig. 14 a front view; and Fig. 15 a perspective view showing the rear of one of the sub-holders.

Similar reference characters in the different figures of the drawings designate corresponding elements or features of construction.

The cabinet comprises a desk part *a* having a top *b* on the rear part thereof, a case on the top *b* and comprising sides *c* and *d* and a back *e*, with the top *b* serving as the bottom of the case. A leaf-base *f* is arranged in the front part of the case on the part *b*. A lid *g* is hinged at 16 and covers the desk part of the cabinet, the lid having a glass panel 17 under which a suitable sheet of paper 18 may be seen that is attached on a leaf 19 which is hinged at 20 to the lid, another sheet of paper 21 being attached to the under side of the leaf 19 which is provided with a finger-hold 22. Substantially the same features have heretofore been embodied in the construction of credit-account cabinets, together with bill-holding leaves of various specific construction.

In the present invention the base *f* is provided on its top with a pair of similar bearings *h* and *h'*, for supporting the bill-holding leaves, being convenient for the purpose, although the bearings may be otherwise supported if desired. Each bearing has holes 23 to receive securing screws or nails and preferably is composed of sheet metal from which is stamped out a pair of elastic side-bearing members *i* and *j* that are bent so as to stand up on the plate to hold a pivot or hinge-pin. These members, however, may be variously modified as to detail, if so desired.

A suitable number of bill-holding leaves are employed, to suit requirements as to capacity, there being a front leaf *k*, intermediate leaves, as *l* and *m*, and a rear leaf *n*, all being alike in size and essential features. Each leaf comprises a thin main part *o* to which a suitable number of strips forming divisional partitions *p* and also sides and ends are attached. Rods *q* extend through and are attached to the partitions and thereby assist in stiffening the part *o*, and bill-clamps *r* formed of spring-wire with coils *s* encircle the rod. Each bill-clamp has a loop-shape rear extension *t* that bears on the part *o* which is also stiffened by a plate *u* that is secured thereto. The plate *u* is provided with ears *v* and *v'* that engage the rod *q*. The shapes of the bill-clamps *r* may be variously modified, and they are adapted to press the bill-slips or the sub-holders upon the part *o* of the leaf. When desired, also, if the part *o* be composed of sufficiently strong material, the bill-clamps may be connected thereto otherwise than as shown.

The front leaf *k* is provided with a pair of hinge parts *w* and *w'* that are secured thereto, each hinge part having a hinge-pin *x* attached thereto so as to be at the lower forward edge of the leaf when the latter is upright, the hinge-pins being forward of the center of gravity of the leaf, the tendency of the leaf when upright being naturally to fall toward the back *e* of the case. The hinge-ends of the leaves have beveled faces *y*, the angle of the face being acute to the front and obtuse to the rear of a leaf and the hinge-parts *w* and *w'* are preferably attached against the end faces, and are adapted to bear upon the bearings *h* and *h'* with the hinge-pins in detachable engagement with the side-bearings *i* and *j*, so that the leaf may be disconnected from its supporting bearing at will, or quickly connected thereto, by moving the leaf so that the hinge-pins will be carried vertically, the bearings *i* and *j* acting as spring clasps on the hinge pins, as will be understood. It will be understood that by reason of the beveled end faces *y* of the leaves, the fronts of the leaves are longer than the opposite rear sides of the leaves, and in connecting the leaves together the longer front lower edges are connected to the shorter rear edges of the next adjacent forward leaves, and therefore the lower ends of the plurality of leaves will normally be in an inclined plane, the upper ends of the leaves being squared and the rearmost leaves being higher than those in front, so that index characters *z* that are placed on the upper fronts of the leaves are always in sight when the leaves are all upright, in order to enable the merchant to readily select either leaf.

The adjustable hinges whereby the leaves are connected together, each two leaves by a pair of hinges, comprise each a hinge part 24 and a hinge part 25 connected together by a hinge-pin 26. The part 24 is so attached to the end of a leaf that the hinge pin will be at the shorter lower edge of the leaf. The part 25 has a slot 27 therein and is attached adjustably to a plate 28 by means of a stud 29 that is secured to the plate 28 and extends through the slot with a head on the opposite side of the hinge part 25. A screw 30 also extends through the slot 27 and through the plate 28 into an adjacent leaf, fastening the plate 28 to the leaf but permitting the movement of the hinge part 25, the plate 28 being placed against the front of the leaf, so that the leaf and the plate 28 may move with respect to the hinge part 25. In order to ordinarily prevent such movement, the hinge part 25 has corrugations 31 and the plate 28 has corresponding corrugations 32, which are slight and afford frictional contact between the two parts sufficient to hold the weight of a leaf when upright. The plate 28 may be provided with other securing devices besides the screw 30 for fixing it to the leaf, as will be understood. The hinge parts may be placed either on the surfaces of the leaves or set in flush, as may be desired, they being preferably set in flush so that the leaves may fit close together, as in Figs. 1, 4, 6 and 10, in order to exclude dust from the pockets in the leaves that contain the bill slips. In some cases in lieu of the corrugations above-mentioned, the plate 28 may be arranged so as to normally bear against the hinge part 24, at the hinge pin 26, as the end 33 in Fig. 12, the connections permitting the plates to yield so that the end 33 may be forced beyond the abutting part with frictional contact therewith, it being understood that elastic metal be used in making the hinges.

Rubbing plates 34 are attached to the back *e* of the case, and rubbing plates 35 are attached to the rear leaf *n*, at the tops thereof, and rubbing plates 36 and 37 are attached respectively to the lower parts of the back and leaf. Two long leaf springs 38 and 39 are attached to the lower part of the back *e*, one spring extending upwardly and forwardly a short distance and the other one similarly a greater distance from the back. The springs have only sufficient strength to prevent the leaves from inclining undesirably toward the back *e* when one or more of the leaves lie on the lid *g* and one or more are upright, as in Fig. 6, where, if one or two more leaves were raised the spring 39 would yield until the spring 38 would be engaged; then when other leaves were raised the added weights thereof would force both springs to yield until all of the upright leaves should force both springs against the back *e*, as in Fig. 4. The back of the rear leaf *n* is provided with rubbing plates 40 and 41 opposite to the springs. When comparatively few leaves are provided the springs may be omitted, or in case the leaves are of less thickness than indicated. The springs 38 and 39, as will be seen, constitute paralleling apparatus in one form, of which other forms may be provided, for moving the upper ends of the remaining upright leaves forward substantially the same distance that their bottoms may be moved forward when one or more of the leaves are being drawn down to the horizontal position, so that when one or more leaves are lying down the remaining upright leaves will be approximately parallel to the plane normally occupied by the forward leaf when upright.

In order to dispense with as many bill-holding leaves as possible and yet provide ample facilities for filing the bill slips in systematic indexed order, sub-holders are provided and may be placed under all of the bill clamps *r* of the rear leaf *n*, or more if desired, each sub-holder comprising two file covers 42 and 43 formed integral, each cover having printed thereon suitable headings and columns adapting it to be used for recording the totals of amounts owing, as shown by slips that may be inserted in the sub-holder which is to be indexed, the cover having an index head and space 44, title of accounts 45, name column heading 46, and amount column heading 47 thereon. Between the covers 42 and 43 are a suitable number of leaves as 48 and 49, each pair formed integral, and each leaf having a projection on which is dissimilar index numbers on opposite sides thereof, as for instance, one side of leaf 48 has number "1" at 50 on one side, and number "6" at 51 on the opposite side thereof, so that the sub-holder is reversible, and after filling the columns on cover 42, the slips may be rearranged and the cover 43 may then be kept forward and used. By this means each bill-clamp may serve to hold in place a considerable number of miscellaneous indexed small accounts. The covers and leaves of the sub-holder are bound together by fasteners 52, as in book binding. It will be understood that, according to usual practice, the bill clamps *r* will be suitably lettered or numbered for indexing purposes, those for holding separate accounts usually being numbered, and those for holding sub-holders with a number of accounts therein being lettered.

In practical use, when a merchant sells on credit, he will use bill-slips of well-known form and make out an original invoice and a carbon copy thereof, giving the copy to the customer and placing the original in its properly indexed place on a bill-holding leaf, under a bill-clamp *r* if the account be a regular or large one, or in a sub-holder if the account be a small or occasional customer. The system of accounting being well known needs no further mention. A quantity of sub-holders will be kept on hand to replace those which may become filled up with their accounts settled. When desired to remove the set of bill-holding leaves and accounts thereon to be placed elsewhere for safe keeping, the group may be lifted together from the bearings *h* and *h'*, and then by using some force the adjustable hinges may be shifted so that the tops and bottoms of the leaves will become even as in Fig. 10, so as to form a compact rectangular block as a whole and occupy the minimum amount of space.

It will be noted that the series of bill holding leaves may be grouped either with their free ends in stepped relation to each other or in a rectangular block, and that the devices for joining adjacent leaves together in such manner that one may be turned upon the other, in the illustrated embodiment of my invention, the adjustable hinges, permit pivotal as well as relatively slidable movements or shifting of the leaves, and that in operation when one or more of the leaves are drawn down, the remaining leaves of the group move forward.

Having thus described the invention, what is claimed as new is—

1. A credit-accounting cabinet including a plurality of hinged bill-holding leaves each provided with bars or rods arranged parallel to the hinge-axes, partitions attached to the leaf and also to the bars or rods, and a plurality of bill-clamps mounted on each bar or rod.

2. A credit-accounting cabinet including a plurality of bill-holding leaves each having a beveled end, the beveled ends of the leaves being hinged one to another and the beveled end of the front leaf being provided with hinging devices, a supporting base, and hinging members mounted on the supporting base to be connected by said hinging devices.

3. A credit-accounting cabinet including a plurality of bill-holding leaves of uniform dimensions hinged one to another each at an end thereof with the axes of the hinge-pins of either two adjacent leaves arranged at adjacent sides of the leaves and at less distance from the opposite end of one of the two leaves than from the opposite end of the other one of said two leaves to support the rearmost leaves in higher planes than the foremost leaves when in upright positions, one of the leaves having hinging members attached thereto at its side opposite to its side that is hinged to an adjacent leaf, a supporting base, and hinge members mounted on the base to be engaged by the hinging members of said one of the leaves.

4. A credit-accounting cabinet including a supporting base, hinging members mounted on the base, a plurality of bill-holding leaves having each a beveled end whose face is inclined at an acute angle to the front and at an obtuse angle to the back of the leaf, the leaves being hinged together with the pivots of the hinges at opposite sides of the leaves, the pivot of either two leaves being at the obtuse-angled corner of one leaf and at the acute-angled corner of the adjacent leaf, and hinging members attached to one of the leaves at the side or front thereof that is acute to the angle of the beveled end to coöperate with the hinging members of the base.

5. A credit-accounting cabinet including a case having a back, a pair of pivot-bearings in the case, and a plurality of bill-holding leaves hinged to each other, the foremost one of said leaves being provided with pivot members attachable to and detachable from said pivot-bearings only when said leaf is approximately upright, said pivot members normally supporting said foremost leaf upon said pivot bearings, and all of said leaves when upright being inclined to lean by gravity toward the back of the case.

6. A credit-accounting cabinet including a supporting base, pivot bearings on the base, and a plurality of bill-holding leaves provided with hinges adjustably connecting the leaves one to another, one leaf of either two adjacent leaves being movable with respect to the adjacent leaf toward or from the axis of the pivots of the connecting hinges, one of said leaves being supported on said pivot bearings and supporting the other leaves.

7. A credit-accounting cabinet including a plurality of bill-holding leaves, and adjustable hinges connecting the leaves one to another, each hinge having a part fixed to one leaf and a pivotally-connected part provided with a relatively adjustable plate fixed to an adjacent leaf.

8. A credit-accounting cabinet including a case, a pair of bearings in the case provided with elastic side members, and a plurality of bill-holding leaves hinged one to another, the front leaf being pivotally and removably mounted in said bearings and supporting the other leaves.

9. A credit-accounting cabinet including a plurality of hinged leaves having each a plurality of partition strips attached thereto, hinge rods extending through and attached to the strips, bill-clamps connected to the hinge rods and engaging the bodies of the leaves, and supporting devices connected to the leaves and the hinge rods between the strips.

10. A credit-accounting cabinet including a plurality of leaves having each a plurality of partition strips attached thereto, rods or bars extending through and attached to the strips, bill-clamps connected to the rods or bars for support, and frame-strips forming parts of the leaves and having said rods or bars connected thereto, said leaves being hinged together at opposite sides thereof and fitting close together at the edges thereof.

11. A credit-accounting cabinet including a case having a back, a pair of pivot bearings in the case, a plurality of bill-holding leaves hinged one to another, one of said leaves being pivotally mounted in said bearings and supporting the other leaves, all of said leaves when upright leaning toward the back of the case, and a spring supported in the case acting, when one or more of the leaves are drawn down, to move the tops of the remaining leaves forward away from the back of the case.

12. A credit-accounting cabinet including a supporting base provided with hinging devices, a plurality of bill holding leaves hinged together and the front one of the leaves provided with hinging devices to cooperate with the hinging devices of the base, and means for locking the hinging devices of the leaf detachably to the hinging devices of the base.

13. A credit-accounting cabinet including a plurality of bill-holding leaves grouped together and provided with adjustable hinging devices connecting the leaves together for shifting either leaf on its hinging devices longitudinally with respect to the other leaves of the group, and means for supporting the group of leaves.

14. A credit-accounting cabinet including a plurality of hinged leaves or frames having each a plurality of partitions thereon and a plurality of rods mounted on each leaf or frame and extending through the partitions, and bill-clamps mounted on the rods between the several partitions.

15. A credit-accounting cabinet including leaves or frames each comprising a main part, strips on the main part forming sides and ends extending continuously along the edge of the main part and partitions between the sides, the leaves being hinged together with the sides and ends engaging the main parts of adjacent leaves or frames, rods mounted in the partitions and sides, and bill-clamps mounted on the rods.

16. A credit accounting appliance, including a plurality of bill holding leaves, and pivotal devices joining adjacent leaves together in a group in such manner that one leaf may be turned upon the other, the said pivotal devices being constructed to permit the bodily shifting of the leaves of the group relatively to each other, whereby the leaves are adapted to be grouped either with their free ends in stepped relationship to each other for normal operation, or in a rectangular pack for storing.

17. A credit accounting appliance, including a plurality of bill holding leaves, and pivotal devices joining adjacent leaves together in a group in such manner that one leaf may be turned upon the other, the said pivotal devices being constructed to permit the bodily shifting of the leaves of the group relatively to each other and to maintain the leaves of the series either in a rectangular pack or with their free ends in stepped relationship to each other.

18. A credit accounting appliance, including a series of bill holding leaves normally arranged for use in a substantially vertical position with their free ends in stepped relationship to each other, and pivotal devices joining adjacent leaves together in a group in such manner that one leaf may be turned upon the other, the said pivotal devices being constructed to permit bodily shifting of the leaves of the group relatively to each other and to move the remaining leaves in the series forward when one or more of said leaves are swung from a vertical to a reclined or horizontal position.

19. In apparatus of the class described, the combination of a series of leaves or frames arranged normally when in use with their upper free ends in stepped relationship to each other, and connections between the lower end of each leaf or frame and the lower end of each adjacent leaf or frame, the said connections including pivots carried by each leaf or frame and about the axis of which the said leaf or frame may turn, and means interposed between the pivots for one leaf and the next adjoining leaf or frame of the series constructed to permit the longitudinal shifting of the leaves or frames relatively to each other.

20. In apparatus of the class described, the combination of a series of leaves or frames of uniform shape and rectangular dimensions, devices connecting the lower ends of adjacent leaves or frames together, including pivots connected with the leaves or frames and about the axes of which the said leaves or frames may turn, and means interposed between the pivots for one leaf or frame and the next leaf or frame of the series constructed to permit the longitudinal shifting of the lower ends of the leaves or frames to and fro relative to each other and to transmit the movement of the lower end of each leaf or frame to the lower ends of the leaves or frames behind it in the series, and means for supporting the leaves or frames as a series.

In testimony whereof, I affix my signature in presence of two witnesses.

PERRY A. McCASKEY.

Witnesses:

LAURENCE C. KEELER,
EDWARD R. ALEXANDER.